United States Patent [19]
Imai

[11] Patent Number: 5,186,489
[45] Date of Patent: Feb. 16, 1993

[54] AIRBAG RESTRAINT SYSTEM
[75] Inventor: Hiroshi Imai, Kanagawa, Japan
[73] Assignee: Ikeda Bussan Co., Ltd., Ayase, Japan
[21] Appl. No.: 718,430
[22] Filed: Jun. 20, 1991
[30] Foreign Application Priority Data
 Jun. 22, 1990 [JP] Japan .................................. 2-164772
[51] Int. Cl.⁵ ............................................ B60R 21/16
[52] U.S. Cl. .................................... 280/728; 280/743
[58] Field of Search .............. 280/728, 743, 733, 729, 280/731, 732; 116/307, 200, 319

[56] References Cited
U.S. PATENT DOCUMENTS
 4,887,842 12/1989 Sato ..................................... 280/743

FOREIGN PATENT DOCUMENTS
 56-43890 10/1981 Japan .
 61-185642 11/1986 Japan .
 0074439 3/1990 Japan ................................... 280/728

Primary Examiner—Margaret A. Focarino
Assistant Examiner—Paul Dickson
Attorney, Agent, or Firm—Foley & Lardner

[57] ABSTRACT

An airbag restraint system for protecting a vehicle passenger in the event of a vehicle serious collision. The airbag is comprised of suspension belts and a pair of belt catch members for preventing the airbag from inflating to project generally in one direction or toward the vehicle passenger during inflation of the airbag. The belt catch members are disposed near the portion of the gas inlet and sewed to the end portions of the suspension belts. The belt catch member has tongue-like members which are overlapped with the end portion of the suspension belt in order to easily distinguish whether the suspension belt are properly put between the belt catch members or not.

8 Claims, 2 Drawing Sheets

AIRBAG RESTRAINT SYSTEM

BACKGROUND OF THE INVENTION

1. Field of the Invention

The present invention related to improvements in an airbag restraint system for protecting a vehicle passenger in a vehicle collision or the like, and more particularly to an airbag which is provided therein with suspension belts and belt catch members to prevent the airbag from inflating generally in one direction upon being supplied with gas from a gas generator.

2. Description of the Prior Art

Hitherto a variety of airbag restraint systems for automotive vehicles have been proposed and put into practical use in order to protect a vehicle passenger in the event of a vehicle collision or the like. Such airbag restraint systems are disclosed, for example, in Japanese Patent Publication No. 56-43890 and Japanese Utility Model Provisional Publication No. 61-185642.

The airbag restraint systems are generally arranged as set forth below. The airbag restraint system includes an airbag 3 which is momentarily inflated upon being filled with gas from a gas generator 2. The airbag 3 is constituted of front and rear side sheet members 3a and 3b which are formed of cloth material. The front and rear side sheet member 3a and 3b are sewed at their peripheral portions with each other thereby to be formed into the bag-shape. The rear side sheet member 3b is formed at its central part with a gas inlet 4 through which the gas from the gas generator 2 is supplied into the airbag 3.

Additionally, the airbag 3 is provided therein with a plurality of suspension belts 6 for the purpose of preventing the airbag 3 from inflating to project generally in one direction or toward the vehicle passenger during inflation of the airbag 3 upon being supplied with gas. Each suspension belt 6 is sewed at its one end section to the inner surface of the front side sheet member 3a. The other end portions of the belt catch members 8 are sewed to the rear side sheet member 3b at a location near the gas inlet.

A pair of the suspension belts 6 have four connecting ends 6a at which the suspension belt 6 is secured to the belt catch members 8. When the four suspension belts 6 are applied to the airbag restraint system, the rear side ends of the four suspension belts 6 are sewed respectively at the four corners of the belt catch member formed in a rectangle shape.

However, difficulties have been encountered in such a conventional airbag restraint system, as discussed hereinafter with reference to FIG. 5 of the drawings of the present invention. The conventional airbag restrains system usually has a pair of belt catch members 8 between which the end portion of each suspension member is put and sewed. However, it is difficult to distinguish whether the end section 6a of the suspension belt 6 is properly disposed under the lower belt catch member 8 or not. This includes a problem that the suspension belt 6 may be improperly sewed to the belt catch members 8 and torn off from the belt catch members 8.

SUMMARY OF THE INVENTION

It is an object of the present invention to provide an improved airbag restraint system in which the suspension belts are properly and accurately sewed between the pair of belt catch members.

An airbag restraint system in accordance with the present invention comprises an airbag which is fluidly connected with a gas generator and adapted to be supplied with gas from the gas generator. The airbag includes a bag-shaped section which has a first sheet member formed with a central opening and a second sheet member. Gas from the gas generator is supplied into the bag-shaped section through a central opening. The second sheet member at an outer peripheral portion to defines a gas chamber which is to be filled with the gas from the gas generator. A plurality of suspension belts is disposed inside the bag-shaped section to connect the first and second sheet members at their inner surfaces. A pair of belt catch members are sewed with one end section of each suspension belt is sewed. The belt catch member is disposed inside said bag-shaped section. A tongue-like member is secured to at least one of the pair of the belt catch members so as to project from the belt catch members. The tongue-like member is disposed to be overlapped with the suspension belt.

With this arrangement, the end portion of the suspension belt is certainly sewed to the belt catch members since the sewed condition is easily checked by visual observation in a manner to check whether the tongue-like portion is hidden by the suspension belt or not. Therefore, a correctly formed airbag restrain system is easily and certainly manufactured. Furthermore, the production steps are largely facilitated by the application of this arrangement.

DETAILED DESCRIPTION OF THE INVENTION

Figure 1:
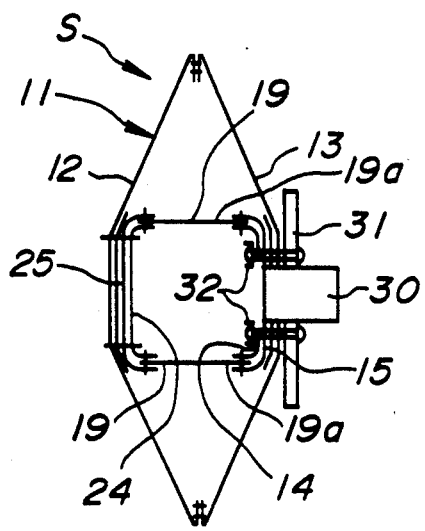
FIG. 1 is a cross-sectional view of an embodiment of an airbag restraint system according to the present invention.
Figure 2:
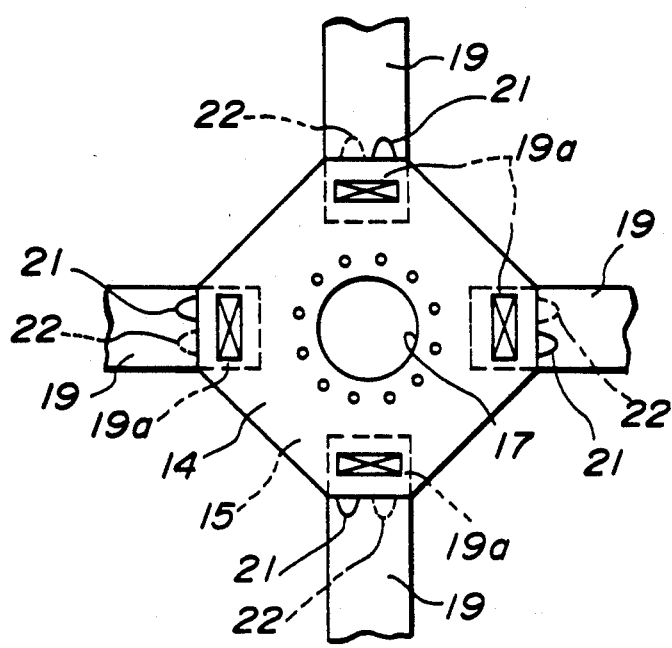
FIG. 2 is a partial plan view showing a connecting condition between belt catch members and suspension belts of FIG. 1.

Referring now to FIGS. 1 and 2, there is shown an embodiment of an airbag restraint system S in accordance with the present invention. The airbag restraint system S of this embodiment is for an automotive vehicle and comprises an airbag 11. The airbag 11 is designed to momentarily inflate in the event of a vehicle serious collision in order to provide a soft cushion for a vehicle passenger. The inflation of the airbag 11 is carried out when the airbag 11 is supplied with gas generated by a gas generator 30. The gas generator 30 is arranged to generate gas to be supplied into the airbag 11 at a predetermined condition or vehicle serious collision.

The airbag 11 includes a bag-shaped section which is constituted of front and rear side sheet or cloth members 12 and 13 which are generally circular, in which the outer peripheral portions of the front and rear side sheet members 12 and 13 are sewed to each other to form a gab-shape. The airbag 11 is sewed at a gas inlet portion 13a of the rear side member 13 with a pair of belt catch members 14 and 15. The belt catch members 14 and 15 are formed in a generally rectangular shape and are cut at its each corner so that the belt catch members 14 and 15 form a octagonal shape. A circular through-hole 17 is formed at the center portion of each belt catch member 14, 15 which portion corresponds to the position of the gas inlet portion 12*a*. An end portion 19*a* o each suspension belt 19 is inserted between and sewed with the pair of the belt catch members 14 and 15.

Four suspension belt members 19 are fixedly disposed inside the airbag 11 in order to prevent the airbag 11 from inflating in a generally one direction or toward the passenger under striking of a directional gas pressured of gas ejected from the gas generator 30 against the central part of the front side sheet member 12 of the airbag 11. An end section 19*a* of each suspension belt 19 is put between and sewed to the belt catch members 14 and 15. The belt catch members 14 and 15 are sewed to the inner peripheral portion of the rear side sheet member 13 which inner peripheral portion defines thereinside the central opening upon forming a sewed section as shown in FIG. 2. The other end section of each suspension belt 19 is sewed to the central part of the front side sheet member 12 through another pair of belt catch members 24 and 25.

The inner peripheral portion of the rear side sheet member 13 is fixedly secured to a base plate 31 which is fixed to a stationary member such as an instrument panel or a steering wheel of the vehicle though not shown. More specifically, the rear side sheet member inner peripheral portion together with the belt catch members 14 and 15 are put between the base plate 31 and a retainer 32 and fixed in position by means of pins (no numerals) for connecting the base plate 31 and the retainer 32. The pins pass through the belt catch members 14, 15 and the inner peripheral portion of the rear side sheet member 13.

A pair of tongue-like members i.e. flaps, 21 and 22 are sewed to each corner portion of the pair of the belt catch members 14 and 15 so as to obliquely sandwich the end portion 19*a* of the suspension belt 19. Each pair of tongue-like members 21 and 22 are arranged so as not to be overlapped with each other as shown in FIG. 2. Such a structure between the belt catch member 14 (15) and the tongue-like member 21 (22) is easily formed in a manner that the pair of tongue-like members 21 (22) is attached at each belt connecting corner of the belt catch member 14 (15) (22) so as to be shifted to one side relative to a center axis of the belt width and that the belt catch members 14 and 15 are connected at their reverse surfaces with each other.

Figure 3:
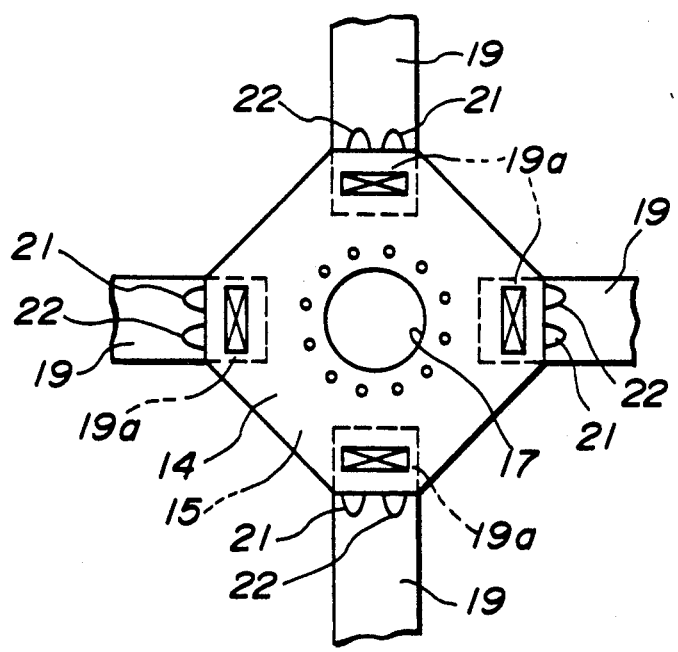
FIG. 3 is a partial plan view showing an incorrect connecting condition between the belt catch members and the suspension belts of FIG. 1.
Figure 4:
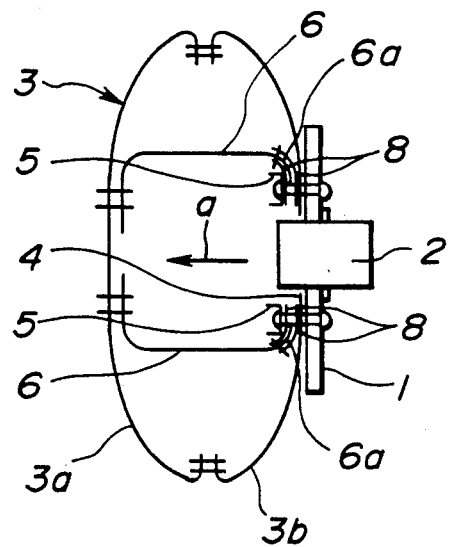
FIG. 4 is a cross-sectional view of a conventional airbag restraint system.
Figure 5:
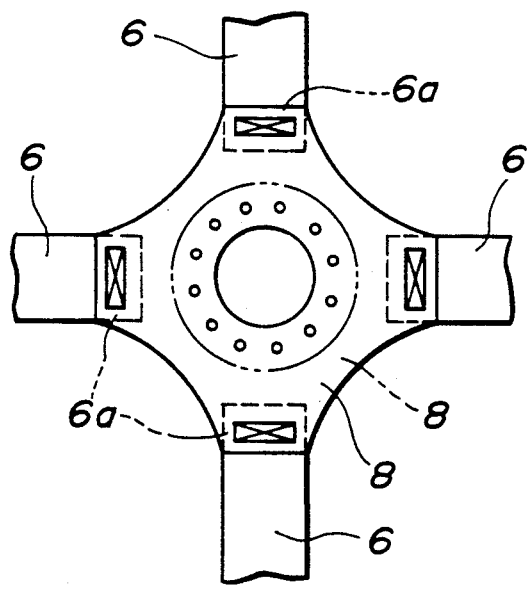
FIG. 5 is a partial plan view showing a connection between belt catch members and suspension belts of FIG. 4.

With the thus arranged airbag restraint system, when each end portion 19*a* of each suspension belt 19 is properly put between the pair of belt catch members 14 and 15, each tongue-like member 21 (22) located at an underside is hidden by the suspension belt 19. For example, if the suspension belts 19 are out of the belt catch members 14 and 15, both tongue-like members 21 and 22 are seen from one direction as shown in FIG. 3. Therefore, this facilitates to judge whether the suspension belt is properly inserted between the pair of belt catch members 14 and 15 or not.

While the four suspension belts 19 have been shown and described as being used in the above example, it will be understood that the principle of the present invention may be applied to airbags having a plurality of suspension belts other than four belts.

Although a pair of the tongue-like members 21 and 22 are secured to each end portion of the belt catch member 14 and 15 in this embodiment, it will be understood that one tongue-like member may be secured to each end portion of one of belt catch members.

What is claimed is:

1. An airbag restraint system comprising:
an airbag fluidly connected with a gas generator and adapted to be supplied with gas from the gas generator, said airbag including:
a bag-shaped section including a first sheet member having a central opening through which gas is supplied into the bag-shaped section from the gas generator, and a second sheet member being connected at its outer peripheral portion with the first sheet member to define a gas chamber which is to be filled with the gas from the gas generator;
a suspension belt connecting the first and second sheet members at their inner surfaces to restrict a projection of the bag-shaped section during inflation of the bag-shaped section;
a pair of belt catch members between which one end section of each suspension belt is sewed, said pair of belt catch members being disposed inside of the bag-shaped section; and
a tongue-like member secured to at least one belt catch member of said pair of belt catch members so as to project from said belt catch member, the tongue-like member being covered with the suspension belt when the suspension belt is put between the pair of belt catch members.

2. An airbag restraint system comprising:
a base plate fixed to a vehicle;
a gas generator secured to said base plate;
an airbag secured at its end portion to said base plate, said airbag having a bag-shaped section including a first sheet member and a second sheet member;
a suspension belt disposed inside of said airbag to restrict a projection of said airbag to a front passenger of the vehicle during inflation of said airbag;
a pair of belt catch members disposed to a near portion of said gas generator, said belt catch members being secured to said airbag and said suspension belt; and
a tongue-like member secured to at least one of said pair of belt catch members so as to project from said belt catch member, said tongue-like member being disposed to be overlapped with said suspension belt, said tongue-like member indicating the installation condition of said suspension belt between said belt catch members.

3. An airbag system restraint system as claimed in claim 2, wherein said belt catch members are formed in a generally octagonal shape and have a circular through-hole at their center portion.

4. An airbag restraint system as claimed in claim 2, wherein said belt catch member is sewed to said airbag.

5. An airbag restrain system as claimed in claim 2, wherein said aribag is secured to said base plate with pins.

6. An airbag restraint system as claimed in claim 2, further comprising another pair of belt catch members which are secured to the second sheet member and to an end section of the suspension belt.

7. An airbag restraint system as claimed in claim 2, wherein the one of said pair of belt catch members to which said tongue-like member is secured is located under said suspension belt when said suspension belt is secured to said airbag.

8. An airbag restraint system comprising:
a base plate fixed to a vehicle;
a gas generator secured to said base plate;
an airbag body fluidly connected with said gas generator and adapted to be supplied with gas from the gas generator, said airbag body including first and second sheet members and fixedly connected to said base plate;
a plurality of suspension belts disposed inside said airbag to restrict a projection of said airbag body during inflation of said airbag;
said plurality of suspension belts connecting the first and second sheet members;
a pair of belt catch members overlapped and disposed to an inner central portion of each sheet member of the airbag body, said belt catch members being secured to said airbag member after sandwiching ends of said suspension belts therebetween; and
means for indicating an installation condition of said suspension belt to said belt catch members, said indicating means being connected to said belt catch members.

* * * * *